(12) United States Patent
Sherman et al.

(10) Patent No.: US 11,848,569 B2
(45) Date of Patent: Dec. 19, 2023

(54) SYSTEM FOR WIRELESS POWER CHARGING

(71) Applicant: POWERMAT TECHNOLOGIES LTD., Petah Tikva (IL)

(72) Inventors: Itay Sherman, Hod Hasharon (IL); Ilya Gluzman, Holon (IL); Elieser Mach, Rosh Tzurim (IL); Amir Salhuv, Nes Ziona (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 0 days.

(21) Appl. No.: 17/692,650

(22) Filed: Mar. 11, 2022

(65) Prior Publication Data

US 2022/0200354 A1  Jun. 23, 2022

Related U.S. Application Data

(63) Continuation of application No. 16/304,881, filed as application No. PCT/IL2018/050266 on Mar. 7, 2018, now Pat. No. 11,277,030.

(60) Provisional application No. 62/467,903, filed on Mar. 7, 2017, provisional application No. 62/492,204, filed on Apr. 30, 2017, provisional application No. 62/560,200, filed on Sep. 19, 2017.

(51) Int. Cl.
*H02J 50/12* (2016.01)
*H02J 50/90* (2016.01)

(52) U.S. Cl.
CPC .............. *H02J 50/12* (2016.02); *H02J 50/90* (2016.02)

(58) Field of Classification Search
CPC .. H02J 50/12; H02J 50/90; H02J 50/80; H02J 5/005; H02J 7/025
See application file for complete search history.

(56) References Cited

U.S. PATENT DOCUMENTS

| 8,035,255 B2 | 10/2011 | Kurs et al. |
| 8,855,554 B2 | 10/2014 | Cook et al. |
| 8,970,070 B2 | 3/2015 | Sada et al. |
| 9,054,542 B2 | 6/2015 | Baarman |
| 9,126,490 B2 | 9/2015 | Cook et al. |
| 9,306,635 B2 | 4/2016 | Kurs et al. |

(Continued)

FOREIGN PATENT DOCUMENTS

| CN | 103098330 A | 5/2013 |
| CN | 103249592 A | 8/2013 |

(Continued)

OTHER PUBLICATIONS

Japanese Office Action dated Sep. 6, 2022 for Japanese Patent Application No. 2019-548372.

(Continued)

*Primary Examiner* — John W Poos
(74) *Attorney, Agent, or Firm* — Volpe Koenig

(57) ABSTRACT

A transmitter may inductively transfer power to a device via a relay. The transmitter may comprise circuitry configured to measure a current or voltage and reconfigure the transmitter with an operating frequency or duty cycle based on a measured change in the current or voltage within a time period. The measured change in the current or voltage within the time period may be caused by a removal of the device or an addition of a new device. The time period may be 200 usec or less.

22 Claims, 3 Drawing Sheets

(56) References Cited

U.S. PATENT DOCUMENTS

| | | | |
|---|---|---|---|
| 9,465,064 B2 | 10/2016 | Roy et al. | |
| 9,496,598 B2 | 11/2016 | Orihara et al. | |
| 9,508,487 B2 | 11/2016 | Von Novak et al. | |
| 9,558,884 B2 | 1/2017 | Shimokawa et al. | |
| 9,625,501 B2 | 4/2017 | Van Wageningen | |
| 9,692,238 B2 | 6/2017 | Matsumoto et al. | |
| 9,711,277 B2 | 7/2017 | Ogasawara et al. | |
| 9,742,199 B2 | 8/2017 | Abe | |
| 9,768,643 B2 | 9/2017 | Kanno et al. | |
| 9,831,917 B2 | 11/2017 | Ichikawa et al. | |
| 9,912,166 B2 | 3/2018 | Baarman et al. | |
| 9,954,397 B2 | 4/2018 | Bunsen | |
| 10,148,119 B2 | 12/2018 | Kanahara et al. | |
| 10,181,755 B2 | 1/2019 | Hosotani et al. | |
| 10,250,083 B2 | 4/2019 | Taylor et al. | |
| 10,340,077 B2 | 7/2019 | Miyamoto | |
| 2008/0079392 A1 | 4/2008 | Baarman et al. | |
| 2008/0157603 A1 | 7/2008 | Baarman et al. | |
| 2009/0096413 A1 | 4/2009 | Partovi et al. | |
| 2009/0174263 A1 | 7/2009 | Baarman et al. | |
| 2010/0109445 A1 | 5/2010 | Kurs et al. | |
| 2010/0141042 A1 | 6/2010 | Kesler et al. | |
| 2010/0181841 A1 | 7/2010 | Azancot et al. | |
| 2011/0037322 A1 | 2/2011 | Kanno | |
| 2011/0133569 A1 | 6/2011 | Cheon et al. | |
| 2011/0227530 A1 | 9/2011 | Karalis et al. | |
| 2011/0291790 A1 | 12/2011 | Okumura et al. | |
| 2012/0032521 A1 | 2/2012 | Inoue et al. | |
| 2012/0063505 A1 | 3/2012 | Okamura et al. | |
| 2012/0193993 A1 | 8/2012 | Azancot et al. | |
| 2012/0235503 A1 | 9/2012 | Kesler et al. | |
| 2013/0015699 A1* | 1/2013 | Mita | B60L 53/126 307/104 |
| 2013/0020862 A1 | 1/2013 | Miller | |
| 2013/0026851 A1 | 1/2013 | Taguchi | |
| 2013/0062965 A1 | 3/2013 | Chernokalov et al. | |
| 2013/0094598 A1 | 4/2013 | Bastami | |
| 2013/0249306 A1* | 9/2013 | Kim | H02J 50/80 307/104 |
| 2013/0249479 A1 | 9/2013 | Partovi | |
| 2014/0015329 A1 | 1/2014 | Widmer et al. | |
| 2014/0015330 A1 | 1/2014 | Byun et al. | |
| 2014/0021798 A1 | 1/2014 | Kesler et al. | |
| 2014/0111154 A1 | 4/2014 | Roy et al. | |
| 2014/0184150 A1 | 7/2014 | Walley | |
| 2014/0239735 A1 | 8/2014 | Abe et al. | |
| 2014/0264517 A1 | 9/2014 | Kim et al. | |
| 2014/0265617 A1 | 9/2014 | Roy et al. | |
| 2015/0061585 A1 | 3/2015 | Obayashi et al. | |
| 2015/0214752 A1* | 7/2015 | Gluzman | H02J 50/12 307/104 |
| 2015/0249484 A1* | 9/2015 | Mach | H02J 50/10 307/104 |
| 2015/0303995 A1 | 10/2015 | Staring et al. | |
| 2015/0372496 A1* | 12/2015 | Lee | H02J 50/12 307/104 |
| 2016/0043564 A1 | 2/2016 | Hatanaka et al. | |
| 2016/0056637 A1 | 2/2016 | Hwang | |
| 2016/0056664 A1 | 2/2016 | Partovi | |
| 2016/0181818 A1 | 6/2016 | Joye et al. | |
| 2016/0181822 A1 | 6/2016 | Yang et al. | |
| 2016/0254701 A1 | 9/2016 | Tsuda et al. | |
| 2016/0329753 A1 | 11/2016 | Gluzman et al. | |
| 2017/0018977 A1 | 1/2017 | Van Wageningen et al. | |
| 2017/0054330 A1 | 2/2017 | You et al. | |
| 2017/0163070 A1 | 6/2017 | Lawrenson et al. | |
| 2017/0194816 A1 | 7/2017 | Tsuda et al. | |
| 2017/0353046 A1 | 12/2017 | Chen et al. | |
| 2020/0287419 A1 | 9/2020 | Sherman et al. | |
| 2020/0287425 A1 | 9/2020 | Sherman et al. | |
| 2020/0321806 A1 | 10/2020 | Sherman et al. | |
| 2020/0328617 A1 | 10/2020 | Sherman et al. | |

FOREIGN PATENT DOCUMENTS

| | | |
|---|---|---|
| CN | 104638774 A | 5/2015 |
| CN | 106218429 A | 12/2016 |
| JP | 2008-207875 A | 9/2008 |
| JP | 2012-504387 | 2/2012 |
| JP | 2012244763 A | 12/2012 |
| JP | 2014-068507 | 4/2014 |
| JP | 2014-207796 | 10/2014 |
| JP | 2015-053781 | 3/2015 |
| JP | 2015-164398 | 9/2015 |
| JP | 2015-181334 | 10/2015 |
| JP | 2015173587 A | 10/2015 |
| JP | 2016-101079 | 5/2016 |
| WO | 2011/097608 | 8/2011 |
| WO | 2012001959 A1 | 1/2012 |
| WO | 2012/058466 | 5/2012 |
| WO | 2013011726 A1 | 1/2013 |
| WO | 2013/036947 | 3/2013 |
| WO | 2013/056234 | 4/2013 |
| WO | 2013145403 A1 | 10/2013 |
| WO | 2014038148 A1 | 3/2014 |
| WO | 2014157030 A1 | 10/2014 |
| WO | 2015/150107 | 10/2015 |
| WO | 2016/157758 | 10/2016 |
| WO | 2017/012979 | 1/2017 |
| WO | 2017/134101 | 8/2017 |

OTHER PUBLICATIONS

Extended European Search Report issued in European Application No. 181602589.0, dated May 24, 2018, 8 pages.
Extended European Search Report issued in European Application No. 18160590.8, dated May 11, 2018, 8 pages.
Extended European Search Report issued in European Application No. 18160592.4, dated Jun. 4, 2018, 8 pages.
Extended European Search Report issued in European Application No. 18160593.2, dated May 25, 2018, 8 pages.
International Preliminary Report issued in International Application No. PCT/IL2018/050256, dated Sep. 19, 2019, 6 pages.
International Preliminary Report issued in International Application No. PCT/IL2018/050258, dated Sep. 19, 2019, 6 pages.
International Preliminary Report issued in International Application No. PCT/IL2018/050260, dated Sep. 19, 2019, 6 pages.
International Preliminary Report issued in International Application No. PCT/IL2018/050266, dated Sep. 19, 2019, 6 pages.
International Search report and Written Opinion issued in International Application No. PCT/IL2018/050256, dated Jul. 4, 2018, 26 pages.
International Search report and Written Opinion issued in International Application No. PCT/IL2018/050258, dated Jul. 5, 2018, 24 pages.
International Search report and Written Opinion issued in International Application No. PCT/IL2018/050260, dated Jul. 5, 2018, 10 pages.
International Search report and Written Opinion issued in International Application No. PCT/IL2018/050266, dated Jul. 2, 2018, 24 pages.
"Wireless power transfer," https://en.wikipedia.org/wiki/Wireless_power_transfer, Available at: https://web.archive.org/web/20170302161952/https://en.wikipedia.org/wiki/Wireless_power_transfer (Mar. 2, 2017).
Notice of Opposition to a European Patent dated Jul. 14, 2020 for European Patent Application No. EP 18160592.4.
Japanese Office Action dated Mar. 1, 2022 for Japanese Patent Application No. 2019-548393.
Japanese Office Action dated Mar. 8, 2022 for Japanese Patent Application No. 2019-548378.
Japanese Office Action dated Mar. 1, 2022 for Japanese Patent Application No. 2019-548446.
Japanese Office Action dated Mar. 1, 2022 for Japanese Patent Application No. 2019-548372.
Chinese Office Action for Application No. 201880020907.0 dated Jan. 19, 2023.

(56) References Cited

OTHER PUBLICATIONS

Chinese Office Action for Application No. 201880021237.4 dated Jan. 19, 2023.
Japanese Office Action for Application No. 2019-548372 dated Sep. 6, 2022.
Korean Office Action dated Oct. 12, 2022 for Korean Patent Application No. 10-2019-7028313.
Korean Office Action dated Oct. 13, 2022 for Korean Patent Application No. 10-2019-7028314.
Korean Office Action dated Oct. 18, 2022 for Korean Patent Application No. 10-2019-7028307.
Chinese Office Action dated Apr. 3, 2023 for Chinese Patent Application No. 201880020859.5.

* cited by examiner

SYSTEM FOR WIRELESS POWER CHARGING

CROSS REFERENCE TO RELATED APPLICATIONS

This application is a continuation of Ser. No. 16/304,881 filed on Nov. 27, 2018, which is a 371 National Phase Application of International Application No. PCT/IL2018/050266, filed Mar. 7, 2018, which claims the benefit of U.S. Provisional Application No. 62/467,903, filed Mar. 7, 2017; U.S. Provisional Patent Application No. 62/492,204 filed Apr. 30, 2017 and U.S. Provisional Patent Application No. 62/560,200, filed Sep. 19, 2017; each of which are incorporated by reference as if fully set forth herein.

FIELD OF INVENTION

The present disclosed subject matter relates to wireless power charging systems. More particularly, the present disclosed subject matter relates to induction charging through medium and methods of load tracking.

BACKGROUND

Growing demand for wireless power charging systems, led to dramatic deployments increase, in a wide variety of venues, raises the need for increasing the effective charging distance between a transmitter and a receiver. Commercially available systems are limited to a maximum distance of approx. 10 millimeters between a transmitter and a receiver of such system.

Wireless power charging systems are usually deployed in public facilities such as restaurants, coffee shops, airports, bus stations; train stations, banks, schools, libraries, hotels, official building, or the like. Typically, the systems are installed on top of surfaces, such as tables, bars, or the like that are accessible to users, thus require decorative appearance and hazards free installation. To meet these requirements on one hand and distance limitations on the other, requires wiring to be routed on top of the surface as well as drilling the surface to make for the distance limitation. In some cases, the transmitter of such commercially available systems can be installed inside the cutout hole in the surface, which complicate the installation and raise its cost, on top of damaging the customer's furniture.

Clearly, such commercially available solutions are not desired in the consumers marketplace. Moreover, the wireless power charging level of these available solutions is limited for charging handheld devices requiring less than 15 watts.

SUMMARY

According to a first aspect of the present disclosed subject matter, a system for wirelessly charging a device by a transmitter capable of receiving messages from a device, the system comprising: a configurable driver for inductively transfer power level for charging the device; a controller configured to control the driver and continuously measuring currents and voltages of the transmitter while the charging, wherein the control is tuning the power level by reconfiguring the driver with parameters selected from a group consisting of operating frequency; duty cycle; amplitude; and any combination thereof, based on the measuring indicating a power level deviation or resetting another power level based on messages.

In some exemplary embodiments, the tuning the power level is selected from a group consisting of increasing power; reducing power; ceasing power; and any combination thereof.

In some exemplary embodiments, the controller ceases to transfer power based on measuring a significant current drop and no power correction message received from the device for a predefined time period.

In some exemplary embodiments, the controller utilizes the continuously measuring to determine a change in joint resonance frequencies with respect to allowed predetermined range.

In some exemplary embodiments, the controller ceases transfer power upon joint resonance frequencies change and perform a recalibration followed by resuming transfer of power.

In some exemplary embodiments, the controller utilizes the continuously measuring to calculate changes in a reflected impedance and the reconfiguring the driver accordingly.

In some exemplary embodiments, the transmitter inductively transfer power to a relay that inductively transfer the power to the device, wherein the transmitter and the relay are separated by a medium with no galvanic connection.

In some exemplary embodiments, the tuning the power level is selected from a group consisting of increasing power; reducing power; ceasing power; and any combination thereof.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

In an embodiment, a transmitter may inductively transfer power to a device via a relay. The transmitter may comprise circuitry configured to measure a current or voltage and reconfigure the transmitter with an operating frequency or duty cycle based on a measured change in the current or voltage within a time period. The measured change in the current or voltage within the time period may be caused by a removal of the device or an addition of a new device. The time period may be 200 usec or less.

BRIEF DESCRIPTION OF THE DRAWING(S)

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

DETAILED DESCRIPTION OF THE PREFERRED EMBODIMENT(S)

Figure 1:
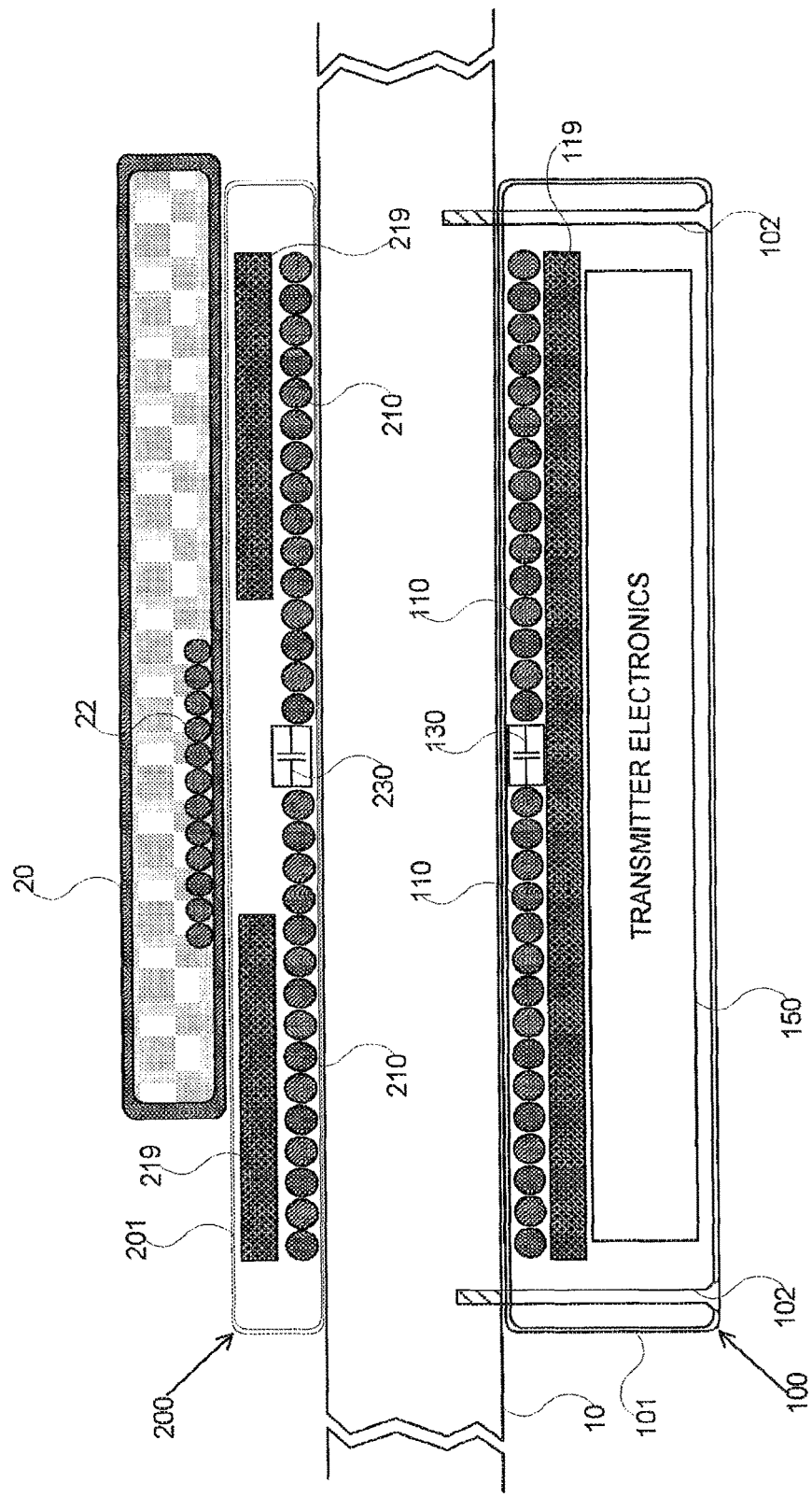
FIG. 1 shows a cross-section view of an installation of wireless power charging system, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

Referring now to FIG. 1 showing a cross-sectional view of an installation of wireless power charging system, in accordance with some exemplary embodiments of the disclosed subject matter. The wireless power charging system may be comprised of a transmitter (Tx) 100 and at least one relay 200.

In some exemplary embodiments, Tx 100 may be mounted on one side of a medium 10, whereas the relay 200 may be mounted on the opposite side of the medium 10. The medium 10 may be made of any material that doesn't conduct electricity, such as for example wood, plastic granite, marble, a combination thereof, or the like. It will be noted that in the present disclosure, medium 10 refers to surfaces, such as tables, desks, bars, or the like that are accessible to users in public venues. For example: restaurants, coffee shops, airports, bus stations; train stations, banks, schools, libraries, hotels, official building, or the like.

In some exemplary embodiments, the Tx 100 comprises a transmitter coil (Lt) 110; a transmitter capacitor (Ct) 130; a transmitter ferrite (Tx-ferrite) 119, and a transmitter electronics (Tx-elec.) 150; all incorporated inside a transmitter enclosure (Tx enclosure) 101 that may be secured to medium 10 by fasteners 102.

In some exemplary embodiments, the relay 200 may comprise a relay coil (Lr) 210; a relay ferrite 219, and a relay capacitor (Cr) 230; all incorporated in a relay enclosure 201 that may be secured to an opposite side of medium 10. Enclosure 201 may have a shape and form factor of a mat, a pad, a saucer, a coaster, a combination thereof, or the like. The enclosure 201 of relay 200 can be secured to medium 10 by glue or any other method, which guarantee that relay 200 and Tx 100 overlap one another from both sides of medium 10. It will be noted that, relay 200 and Tx 100 overlap each other so that Lt 110 and Lr 210 shall be substantially aligned, to face one another, for optimizing the inductance between the two, as depicted in FIG. 1.

In some exemplary embodiments, Tx 100, with is powered by power supply (PS) 160 (not shown), can be configured to utilize relay 200 for inductively (wirelessly) charge device 20 placed on relay 200. Device 20 may be a user's device such as a tablet, a laptop a Smartphone, or any chargeable mobile handsets; which comprise a built-in coil 22 configured to receive inductive power and charge a battery of the device 20. It should be noted that, the built-in coil 22 refers to standard coils of receiver for devices listed above. Typically, these standard coils have a diameter of approximately 40 millimeters.

It should be noted that, the terminology of components Lt 110, Lr 210/Lr 310 and coil 22 in the present disclosure correspond to: first Tx coil, second Tx coil and Rx coil, respectively, of the related provisional patent applications.

Similar to Lr 210 and Lt 110, coil 22 and Lr 210 may substantially face and overlap each other, i.e. centers of coil 22 and Lr 210 can be aligned, in order to meet one of the effective charging criteria's. To ensure the alignment, enclosure 201 of the relay 200 can be marked with a layout that indicates to a user, the optimal place for positioning device 20 on top of relay 200 so as to gain effective charging. However, the wireless power charging system may be adapted to provide power charging even if device 20 is not precisely positioned on top of relay 200 as depicted in FIG. 1.

In some exemplary embodiments, both Lr 210 and Lt 100 may be flat spiral air core coils, having a diameter greater than 100 mm. The utilization of such large coils allows for relatively high coupling between Lr 210 and Lt 100 despite a thickness equal to or greater than 30 millimeters of medium 10. In the embodiment depicted in FIG. 1, the coupling factor between Lr 210 and Lt 100 may be greater than 0.25. The coupling between typical coil 22 and Lr 210 may be greater than 0.15 in the embodiment depicted in FIG. 1.

In some exemplary embodiments, Tx 100 comprises a transmitter ferrite (Tx-ferrite) 119. Tx-ferrite 119 can be a layer made of ferrite material with suitable magnetic characteristics of permeability & core losses. One technical reason for utilizing the Tx-ferrite 119 is providing a buffer for protecting Tx-electronics 150 from inductive energy. Another technical reason for utilizing the Tx-ferrite 119 can be to increase the magnetic field facing relay 200; thus, the inductance of the Lt 110. Tx-ferrite 119 properties such as thicknesses, flexibility, fragility a combination thereof, or the like can be dictated by an application in which the system of the present disclosure is provided. For example, the thickness and the material from which the medium 10 is made of. Since Lt 110 may have a shape of a circle, the shape of Tx-ferrite 119 may also be a circle, having a diameter equal to or bigger than the Lt 110 external diameter. Alternatively, Tx-ferrite 119 may have a shape of any geometric plane figure as long as Lt 110 external diameter is an inscribed circle within the geometric plane figure.

In some exemplary embodiments, relay 200 may comprise a relay ferrite 219. Relay ferrite 219 may be a layer made of ferrite material similar to Tx-ferrite 119. One technical reason for utilizing the Relay ferrite 219 is to provide a buffer for protecting the electronic circuitry of device 20 from inductive energy. Another technical reason for utilizing the relay ferrite 219 may be to increase the magnetic field facing the Tx 100; thus, the inductance of Lr 210. Relay ferrite 219 possesses properties similar to the properties of Tx-ferrite 119. Since Lr 210 can have a shape of a circle, the shape of relay ferrite 219 can also be a circle having a diameter equal to or bigger than the Lr 210 external diameter. Alternatively, Relay ferrite 219 may have a shape of any geometric plane figure as long as Lr 210 external diameter is an inscribed circle within the geometric plane figure.

It should be noted that relay ferrite 219 requires a cutout situated at its center. The size of the cutout can be equal to or slightly larger than an external diameter of a typical receiver coil of a chargeable device, such as coil 22 of device 20. The shape of the cutout may be a circle or any geometric surface that surrounds coil 22 shape in order to allow passage of magnetic flux between Lr 210 and coil 22.

In some exemplary embodiments of the disclosed subject matter, at least one resonance capacitor (Ct) 130 can be connected in series to Lt 110 and at least one resonance capacitor (Cr) 230 can be connected in series to Lr 210. The resonant capacitors are placed inside the inner diameter space of each coil accordingly. Alternatively, the resonant capacitors can be placed next to the outer diameter space of each coil accordingly, or elsewhere within the respected enclosure.

The relay ferrite 219 of the present disclosure increases the coupling factor of coil 22 and Lr 210 to better simulate a behavior of a coil 22 with commercially available standard transmission coil, and also reduces any direct coupling from Lt 110 to coil 22, which is not desired in the system of the present disclosure. In addition, the resonance capacitors of both the Tx 100 and relay 200 are intended to stabilize the system operational point, dependency of coil 22 loads and allow high efficiency in power transfer. In some exemplary embodiments, the resonance frequency of Lt 110 and Ct 130, (i.e. Tx 100 LC circuit), can be set to significantly lower than the resonance frequency of a typical coil such as coil 22 (approximately 100 kHz) and substantially lower than the resonance frequency of Lr 210 and Cr 230 (i.e. relay 200 LC circuit).

In some exemplary embodiments, a combination of the Tx 100 and the relay 200 LC circuits, when no load is present, may form two distinct resonance frequencies, hereinafter, joint resonance frequencies (JRF). The first resonance frequency of the JRF, may be adjacent to Tx 100 LC circuit's resonance frequency; however, lower in any case. The second resonance frequency of JRF may be adjacent to relay 200 LC circuit's resonance frequency, however higher in any case. It should be noted that the phrase "a combination of the Tx 100 and the relay 200 LC circuits" refers in the present disclosure to a state where Tx 100 and relay 200 face each other, such as depicted in FIG. 1 and power is applied to the Tx 100. It should also be noted that the second resonance frequency, i.e. higher resonance frequency, shall be regarded as the present disclosure system main resonance frequency (MRF).

The resonance frequency of Tx 100 LC circuit and relay 200 LC circuit are designed in such a way that their JRF, with no Coil 22 on them, is tuned to be a specific range (typically 20-50 kHz) lower than the desired maximal operational frequency of the Tx 100 and is higher than coil 22 resonance frequency.

As an example, the inductance of Lt 110 may be approximately 30 pH; the capacitance of Ct 130 may be approximately 290 μF which provides a Tx 100 LC circuit's resonance frequency of approximately 54 kHz. Whereas, the inductance of Lr 210 may be approximately 60 pH; the capacitance of Ct 130 may be approximately 37.5 nF which provides a relay 200 LC circuit's resonance frequency of approximately 106 kHz. In such preferred exemplary embodiment, the system MRF may be 117 kHz (i.e. higher than 106 kHz of the relay 200 LC circuit's resonance frequency) providing that the gap between installed relay 200 and Tx 110 may be approximately 30 millimeters.

In some exemplary embodiments, an operating frequency (OPF) may range between 121 kHz-140 kHz, where the lower OPF of the range may be 4 kHz higher than the MRF, i.e. 117 kHz. and maximal frequency may be 5 kHz lower than a regulatory limit, i.e. 145 kHz. Alternatively, the maximal OPF may be set below the MRF and the regulatory maximal frequency limit. For an installation having similar coils as the example described above, with a medium 10 thickness of 0.5", the MRF may be at 140 kHz. Thus, the operational range may be set to 115 kHz-136 kHz, were the maximal frequency is 4 kHz lower than the MRF and lower than the regulatory limit.

It will be understood that the system of the present disclosed avoids operation at resonance frequencies. The preferred OPF of the present disclosure system may be at a range of frequencies that are shifted to a frequency either lower or higher than the main resonance frequency (MRF).

Figure 2:
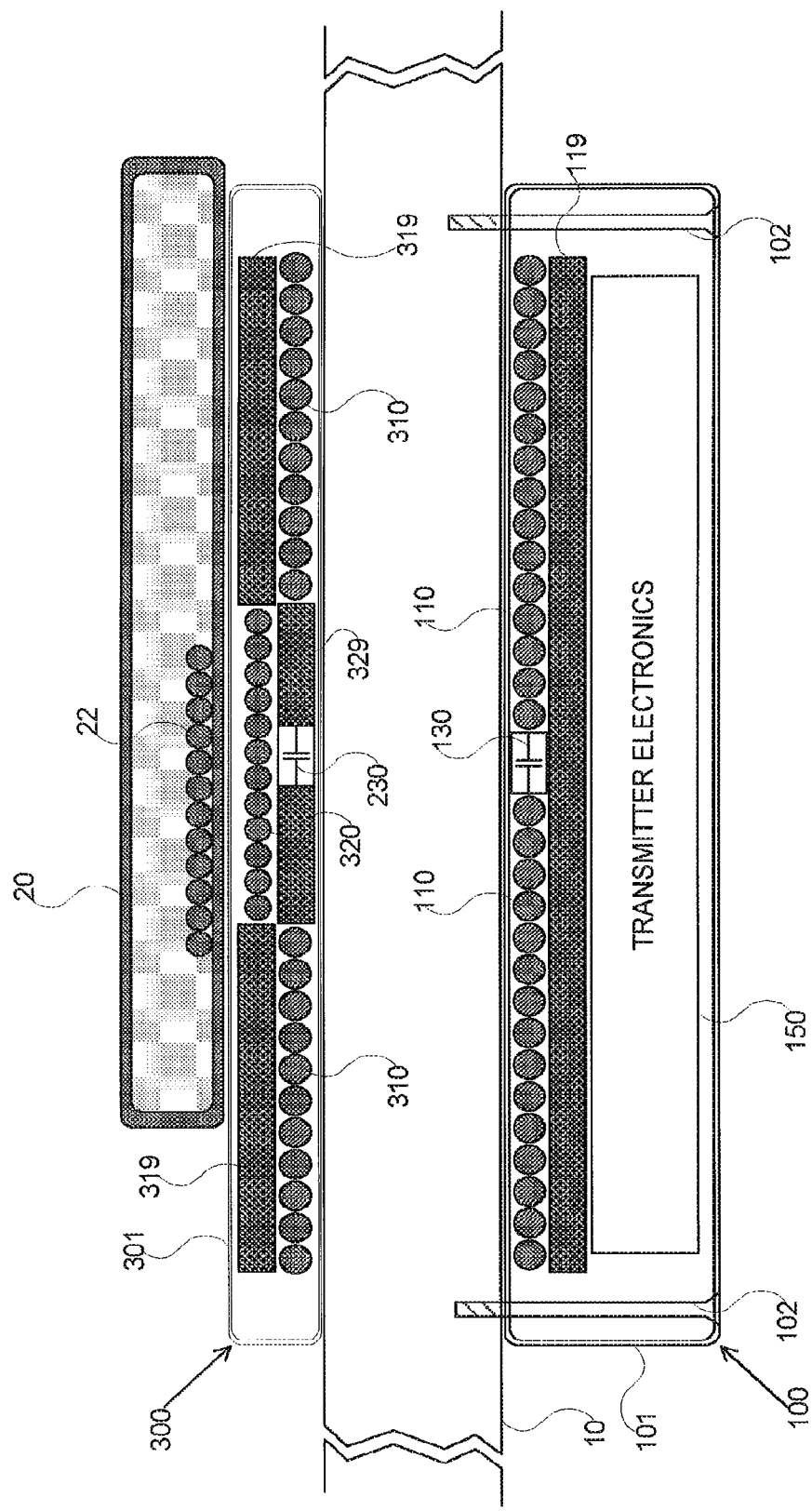
FIG. 2 shows a cross-section view of an installation of another wireless power charging system, in accordance with some exemplary embodiments of the disclosed subject matter.

Referring now to FIG. 2 showing a cross-sectional view of an installation of another wireless power charging system, in accordance with some exemplary embodiments of the disclosed subject matter.

In some exemplary embodiments, Tx 100 may be mounted on one side of a medium 10, whereas the relay 300 may be mounted on the opposite side of the surface 10. The medium 10 can be made of any material that doesn't conduct electricity, such as for example wood, plastic granite, marble, a combination thereof, or the like. It will be noted that in the present disclosure, medium 10 refers to surfaces such as tables, desks, bars, or the like that are accessible to users in public venues. For example: restaurants, coffee shops, airports, bus stations; train stations, banks, schools, libraries, hotels, official building, or the like.

In some exemplary embodiments, the Tx 100 comprises a transmitter coil (Lt) 110; a transmitter capacitor (Ct) 130; a transmitter ferrite (Tx-ferrite) 119, and a transmitter electronics (Tx-elec.) 150; all incorporated inside a transmitter enclosure (Tx enclosure) 101 that is secured to medium 10 by fasteners 102.

In some exemplary embodiments, the relay 300 comprises a relay coil (Lr) 310; a second relay coil (sLr) 320; a relay ferrite 319; a second relay ferrite 329 and a relay capacitor (Cr) 330; all incorporated in a relay enclosure 301 that may be secured to an opposite side of medium 10. Enclosure 301 can have a shape and form factor of a mat, a pad, a saucer, a coaster, a combination thereof, or the like. The relay 300 enclosure 301 can be secured to medium 10 by glue or any other method that guarantee that relay 300 and Tx 100 overlap to one another from both sides of medium 10. It will be noted that relay 300 and Tx 100 overlap each other so that Lt 110 and Lr 310 shall be substantially aligned so as to face one another, for optimizing the inductance between the two, as depicted in FIG. 2.

In some exemplary embodiments, Tx 100 is powered by power supply (PS) 160 (not shown in FIG. 2, shown in FIG. 3), may be configured to utilize relay 300 for inductively (wirelessly) charge device 20 placed on relay 300. Device 20 may be a user's device such as a tablet, a laptop a Smartphone, or any chargeable mobile handsets, that comprise a built-in coil 22 configured to receive inductive power and charge a battery of the device 20.

In some exemplary embodiments of the disclosed subject matter, relay 300 may further comprise a secondary relay coil sLr 320 that can be electrically connected in series with Lr 310. Instead, Lr 310 can be arranged in two parts that are situated in two planer heights, wherein the inner coil (i.e. sLr 320) or alternatively part of Lr 310 is elevated compared to the outer part of Lr 310 that face Lt 110.

Coil 22 and sLr 320 can substantially face and overlap each other, i.e. centers of coil 22 and sLr 320 are align in order to meet one of the effective charging criteria's. For alignment, enclosure 301 of the relay 300 may be marked with a layout that indicates to a user the optimal place for positioning device 20 on top of relay 300 in order to gain effective charging. However, the wireless power charging system may be adapted to provide power charging even if device 20 is not precisely positioned on top of relay 300 as depicted in FIG. 2.

In some exemplary embodiments, both Lr 310 and Lt 100 may be flat spiral air core coils having a diameter greater than 100 mm, while sLr 320, also having a flat spiral air core coil, may have a smaller diameter that suits typical receiver's coils such as coil 22. The utilization of such large coils allows relatively high coupling between Lr 310 and Lt 100 in order to overcome a thickness equal to or greater than 30 mm of medium 10. In the embodiment depicted in FIG. 2, the coupling factor between Lr 310 and Lt 100 may be greater than 0.25, for medium thickness of up to 30 millimeters. The coupling between typical coil 22 and sLr 320 may be greater than 0.15 in the embodiment depicted in FIG. 2.

It should be noted that sLr 320 may not be directly influenced by Lt 110 because the second relay ferrite 329 blocks the magnetic field (to be described in detail further below); however, the same current induced to Lr 310 flows through sLr 320, since Lr 310 and sLr 320 are connected in series.

In some exemplary embodiments, Tx 100 may comprise a transmitter ferrite (Tx-ferrite) 119. Tx-ferrite 119 may be a layer made of ferrite material with suitable magnetic characteristics of permeability & core losses. One technical reason for utilizing the Tx-ferrite 119 may be to provide a buffer for protecting the Tx-elec. 150 from inductive energy. Another technical reason for utilizing the Tx-ferrite 119 may be to increase the magnetic field facing relay 300, and thus the inductance of Lt 110. Tx-ferrite 119 properties such as thicknesses, flexibility, fragility a combination thereof, or the like may be dictated by an application in which the system of the present disclosure may be provided. For example, the thickness and the material from which the medium 10 is made of. Since Lt 110 may have a shape of a circle, the shape of Tx-ferrite 119 may also be a circle having a diameter equal to or bigger than the Lt 110 external diameter. Alternatively, Tx-ferrite 119 may have a shape of any geometric plane figure as long as Lt 110 external diameter is an inscribed circle within the geometric plane figure.

In some exemplary embodiments, relay 300 may comprise a relay ferrite 319. Relay ferrite 319 can be a layer made of ferrite material similar to Tx-ferrite 119. One technical reason for utilizing the Relay ferrite 319 may be to provide a buffer for protecting the electronic circuitry of device 20 from inductive energy. Another technical reason for utilizing the relay ferrite 319 is to increase the magnetic field facing the Tx 100; thus, increase the inductance of Lr 310. Relay ferrite 319 may possess properties similar to the properties of Tx-ferrite 119. Since Lr 310 may have a shape of a circle, the shape of relay ferrite 319 may also be a circle having a diameter equal to or bigger than the Lr 310 external diameter. Alternatively, relay ferrite 319 can have a shape of any geometric plane figure as long as Lr 310 external diameter is an inscribed circle within the geometric plane figure.

It should be noted that relay ferrite 319 may require a cutout situated at its center. The size of the cutout may be equal or slightly larger than an external diameter of a typical receiver coil of a chargeable device such as coil 22 of device 20. The shape of the cutout may be a circle or any geometric plane that surround coil 22 shape in order to allow magnetic flux to pass between Lr 310 and coil 22.

In some exemplary embodiments of the disclosed subject matter, the relay 300 further comprises a second relay ferrite 329 configured to block magnetic field induced by Lt 110 to sLr 320 and enhance the sLr 320 inductance toward coil 22. The second relay ferrite 329 possesses properties similar to the properties of Tx-ferrite 119 and relay ferrite 319. The shape ferrite 329 may be equal to or slightly larger than the cutout shape of relay ferrite 319. Practically, the cutout of relay ferrite 319 can be used as ferrite 329 that is situated inside the inner diameter of Lr 310 and at the same plane, while the sLr 320 may be situated on top of ferrite 229.

In some exemplary embodiments of the disclosed subject matter, at least one resonance capacitor (Ct) 130 can be connected in series to Lt 110 and at least one resonance capacitor (Cr) 330 may be connected in series to Lt 310. The resonant capacitors may be placed inside the inner diameter space of each coil accordingly. Alternatively, the resonant capacitors can be placed next to the outer diameter space of each coil accordingly, or elsewhere within the respected enclosure.

The relay ferrite 319 of the present disclosure increases the coupling factor of coil 22 and Lr 310 to better simulate a behavior of a coil 22 with commercially available standard transmission coil and also reduces any direct coupling from Lt 110 to coil 22, which is not desired in the system of the present disclosure. In addition, the resonance capacitors of both the Tx 100 and relay 300 are intended to stabilize the system operational point, dependency of coil 22 loads and allow for high efficiency in power transfer. In some exemplary embodiments, the resonance frequency of Lt 110 and Ct 130, (i.e. Tx 100 LC circuit) may be set to be significantly lower than the resonance frequency of a typical coil 22 (approximately 100 kHz) and substantially lower than the resonance frequency of Lr 310 and Cr 330 (i.e. relay 300 LC circuit).

In some exemplary embodiments, a combination of the Tx 100 and the relay 300 LC circuits, when no load is present, may form two distinct resonance frequencies, hereinafter, joint resonance frequencies (JRF). The first resonance frequency of JRF can be adjacent to Tx 100 LC circuit's resonance frequency, however, in any case, it will be lower. The second resonance frequency of JRF, can be adjacent to relay 300 LC circuit's resonance frequency, however, it will be higher. It should be noted that the phrase "a combination of the Tx 100 and the relay 300 LC circuits" refers in the present disclosure to a state where Tx 100 and relay 300 face each other, as depicted in FIG. 2, and power is applied to the Tx 100. It should also be noted that the second resonance frequency, i.e. higher resonance frequency, shall be regarded in the present disclosure system as main resonance frequency (MRF).

The resonance frequency of Tx 100 LC circuit and relay 300 LC circuit are designed in such way that their JRF, with no Coil 22 on them, is tuned to be of a specific range (typically 20-50 kHz) that is lower than the desired maximal OPF of the Tx 100 and is higher than coil 22 resonance frequency.

In one preferred exemplary embodiment, the inductance of Lt 110 can be approximately 30 pH; the capacitance of Ct 130 can be approximately 290 μF which provides a Tx 100 LC circuit's resonance frequency of approximately 54 kHz. Whereas, the inductance of Lr 310 can be approximately 60 pH; the capacitance of Ct 130 can be approximately 37.5 nF which provides a relay 300 LC circuit's resonance frequency of approximately 106 kHz. In such preferred exemplary embodiment, the system MRF can be 117 kHz (i.e. higher than 106 kHz of the relay 300 LC circuit's resonance frequency) providing that the gap between the installed relay 300 and the Tx 110 can be approximately 30 millimeters.

In some exemplary embodiments, an OPF ranges between 121 kHz-140 kHz, where the lower OPF of the range can be 4 kHz higher than the MRF, i.e. 117 kHz, and the maximal frequency can be 5 kHz lower than a regulatory limit, i.e. 145 kHz. Alternatively, the maximal OPF can be set below the MRF and the regulatory maximal frequency limit. For an installation having similar coils as in the example described herein above, with a medium thickness of 0.5", the MRF can be at 140 kHz. Thus, the operational range can be set to 115 kHz-136 kHz, were the maximal frequency is 4 kHz lower than the MRF and lower than the regulatory limit.

Figure 3:
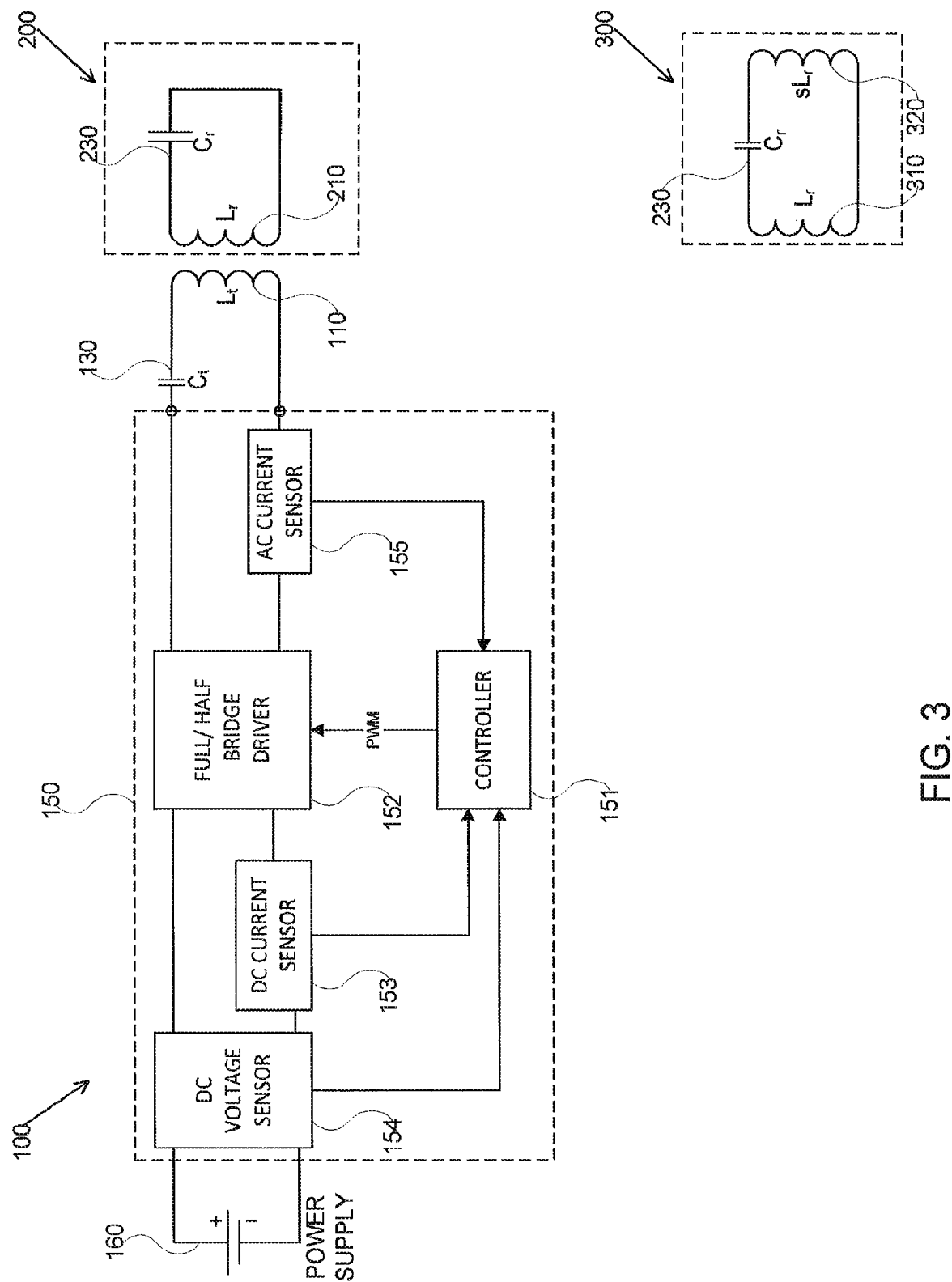
FIG. 3 shows a block diagram of a system for wireless power charging through medium, in accordance with some exemplary embodiments of the disclosed subject matter.

Referring now to FIG. 3 showing a block diagram of system for wireless power charging through medium, in accordance with some exemplary embodiments of the disclosed subject matter. The system for wireless power charging through medium comprises a PS 160, a Tx 100 transmitter and either a relay 200 or relay 300.

In some exemplary embodiments, the system can be adapted to utilize Tx 100 for charging a user's chargeable device, such as device 20 of FIGS. 1 and 2, via either a relay 200 or relay 300. Both relay 200 and relay 300 can be passive electronic circuit acting as repeaters for wirelessly transmitting charging energy to device 20 or the like. Relay 200 can comprise at least one coil (inductor) and one capacitor that form an LC resonance circuit, such as depicted in FIG. 1. An alternative relay, i.e. relay 300, can be provided in order to enhance the inductance and coupling with coil 22 of device 20. Relay 300 comprises at least two coils and one capacitor that form an LC resonance circuit such as the circuit depicted in FIG. 2.

In some exemplary embodiments, Tx 100 can comprise a transmitter electronics (Tx elect) 150, at least one Lx 110 coil, and a capacitor Ct 130, configured for inducing current in the coils of either relay 200 or relay 300, as depicted in FIG. 1 and FIG. 2 respectively.

In some exemplary embodiments, the Tx-elect 150 comprises of a controller 151; a full or half bridge driver 152, a DC current sensor 153, a DC voltage sensor 154, and an AC current sensor 155.

Controller 151 can be a central processing unit (CPU), a microprocessor, an electronic circuit, an integrated circuit (IC), or the like. Additionally, or alternatively, controller 151 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Controller 151 can be utilized to perform computations required by Tx 110 or any of its subcomponents.

In some exemplary embodiments of the disclosed subject matter, the controller 151 is configured to determine the following parameters:
   a. DC voltage across PS 160 by acquiring and measuring an outcome of DC voltage sensor 154.
   b. DC current supplied by PS 160 by acquiring and measuring an outcome of DC current sensor 153.
   c. AC current supplied to Lt 110 by acquiring and measuring an outcome of AC current sensor 155. Alternatively, output AC current can be determined by sensing instantaneous current flowing to the driver from the power supply with DC current sensor 153.

It should be noted that determining parameters for AC current can comprise peak current, average of absolute current, RMS current, amplitude of first harmonic, and any combination thereof, or the like.

In some exemplary embodiments, controller 151 comprises a semiconductor memory component (not shown). The memory may be persistent or volatile memory, such as for example, a flash memory, a random-access memory (RAM), a programmable read only memory (PROM), a re-programmable memory (FLASH), and any combination thereof, or the like.

In some exemplary embodiments, the memory retains program code to activate controller 151 to perform acts associated with determining a pulse width modulation (PWM) signal that controls the full or half bridge driver 152. Driver 152 can adjust the output current flowing through Lt 110, i.e. power provided by the Tx 100, by modulating the OPF and/or duty cycle of the current flowing through Lt 110. In some exemplary embodiments, the PWM signal generated in the controller 151 tunes the modulation to satisfy the wireless charging needs of a load, such as device 20. In an alternative embodiment, the amplitude of the DC power supply may be controlled.

It should be noted that the PWM signal frequency and duty cycle can be set by controller 151, within the OPF range, as previously described. Additionally, controller 151 can change the OPF within the OPF range based on the power demand of the device 20.

In some exemplary embodiments, the controller 151 can utilize its memory to retain, connectivity software, monitoring information, configuration and control information and application associated with charging management of present disclosure system.

In some exemplary embodiments, the controller 151 can be configured to communicate with device 20 based on protocols that comply with the following communications standards: power matters alliance (PMA); wireless power consortium (WPC) and AirFuel Alliance. According to these communication methods, but not limited to, the controller 151 can be configured to acquire user's credentials from device 20 in order to authenticate users for granting and regulating charging services. Additionally, or alternatively, the controller 151 can be also configured to acquire from device 20, its power requirements.

For the sake of simplifying the explanation of the embodiments hereinafter, relay 200 and relay 300 may be referred to as "relay", also coils Lr 210 and Lr 310 may be referred to as "Lr". It should be noted that the following solution methods and procedures apply for both relay 200 and relay 300 and their respected subcomponents.

It will be noted that the solutions/procedures/methods described hereinafter are not limited to the system depicted in FIGS. 1-3 of the present disclosure, and in fact, may apply to enhance the operation of commercially available inductive power transfer systems. The description of the embodiments hereinafter refers to elements of the system depicted in FIGS. 1-3, that are used as examples for describing the following solutions/procedures that may apply to other inductive power transfer systems.

It will also be noted that the solutions/procedures described hereinafter may utilize a calibration method disclosed in a co-pending application submitted by the applicant of the subject matter disclosed herein on the same date. The co-pending application is incorporated in its entirely by reference. In some exemplary embodiments, the calibration method may also yield determining of coupling factor (k) between a Tx 100 and a relay, JRF, MRF, OPF, OPF range, digital ping, and any combination thereof, or the like of the Tx 100. In some exemplary embodiments, the coupling factor (k) is a predetermined value.

In some exemplary embodiments, the system is provided with solutions and procedures for protecting Tx 100, relay 200, relay 300 and a load, which may be device 20, from damages and hazard condition. Such damages may be caused by misplacement of the load on a relay mat, sudden movement of the load, sudden load replacement, foreign artifacts affecting the magnetic field, any combination thereof, or the like. Additionally or alternatively, the solutions and procedures described hereinafter may be used for enhancing the communication signaling protocol standard.

One technical problem dealt with by the present disclosure is dealing with sudden changes of device 20, i.e. replacement of the device 20 with a different one, placement of additional magnetic reactive elements in proximity of the device 20 and or Tx 100. Such incident can potentially change the inductances of TX 100 that leads to change in its JRF and subsequently the OPF beyond the scope of typical devices such as device 20 charging requests. Such change may be resulted in overvoltage and or overcurrent conditions that may damage the Tx 100, relay, device 20, any combination thereof, or the like.

In some exemplary embodiments, technical solutions of the technical problem depicted above as well as other technical solutions listed in the present disclosure are based on real-time measurements and calculations conducted by controller 151. Controller 151 can continually monitor the DC voltage, DC current AC (output) current of the Tx 100, with sensors 154, 153, and 155 respectively. Based on the DC voltage, given by sensor 154, and since the controller 151 modulates the output of driver 152 with a PWM signal, the controller can thus calculate an AC (output) voltage of the Tx 100. Based on these measured and calculated data, the controller can be further configured to determine the AC current phase, a duty-cycle, an impedance viewed by the Tx 100, amplitude of the driving circuit as well as the output power provided by Tx 100 at any given time. Additionally, or alternatively, controller 151 can be utilized to execute calibration methods, which may also yield in determining a coupling factor (k) between a Tx 100 and a relay; the JFR and the OPF range of the Tx 100.

One technical solution is detecting a JRF change by comparing the quotient of AC voltage division by the driver 152 set amplitude to predefined range of expected values. In some exemplary embodiments, the amplitude value may be a function of the driving voltage and the duty cycle correlated to the amplitude of first a harmonic of the driver. The predefined range may cover ratios, for operation with typical load range at the designated operation frequency. In some exemplary embodiments, the range may be determined based on simulations or empiric testing as a pre-calibration of a specific Tx 100 design. The range for the ratio across all typical loads may be relatively narrow since the OPF may be offset from the MRF. For example, the maximal allowed ratio may not be higher than 25% of the minimal allowed ratio.

Upon detection of JRF change, the Tx 100 may cease power transfer and redefine the JRF by repeating the calibration procedure that will be followed by resuming power transfer based on new OPF. In some exemplary embodiments, the Tx 100 may perform the calibration procedure while maintaining operation. The procedure may be based on incrementally modifying the OPF, up or down, while monitoring the effect on AC voltage to determine if the modified OPF resolved the issue.

It shall be noted that commercially available wireless charging systems base their communication on standards, such as WPC, PMA and Air Fuel protocols that utilize load's (device 20) feedback tuning for power tracking and controlling the transmitter accordingly.

One technical problem dealt with by the present disclosure is that these communication protocols are inherently slow, which may pose a problem in designs that use OPF that are relatively close to JFR and also have large loads variance as well as uncontrolled movement of device 20 on the relay.

One technical solution is to expedite power tracking process in addition to supporting the listed above communication protocols. In some exemplary embodiments, an expedited tracking process may be adapted to promptly respond to changes in operation conditions, by controller 151, irrespective of the feedback-based power tuning. Moreover, the expedited tracking process may be implemented in all modes of operation with intent to compensate for changes in OPF.

In some exemplary embodiments, power tuning demands on the load side may be reflected and acknowledged in the Tx 100 side thanks to the real-time measurements and calculations, conducted by controller 151. Consequently, Tx 100 may make up for the power tuning demands by altering driver 152 amplitude, duty cycle, OPF, any combination thereof, or the like, to satisfy the load demand.

As an example, once the threshold setpoint is reached, the controller 151 is interrupted and can adopt operation point.

Alternatively, the peak voltage or current may be continually tracked in intervals of Tsample e.g. 20 microseconds. The response time from threshold crossing to controller modifying operation point is designed to be <Tsample>. The controller continues pooling the voltage peaks at intervals of Tsample. Assuming a working point with driving amplitude of Vs: at this point, the measured Vpc_peak is Vpc_stab. The controller 151 may set the threshold to Vpc_stab*C1 (default value of C1=1.2). If the threshold is crossed and the measured peak is Vpc_meas, then the algorithm may set the driving voltage Vs to Vstab*Vpc_stab/Vpc_meas. The controller 151 keeps tracking the peak every Tsample and updates the Vs according to Vs(n)=Vs(n−1)*Vpc_stab/Vpc_meas. Updates may be performed for C2 cycles (default value C2=10). If the value of Vpc_meas/Vs>C3 (default value C3=0.75)

The frequency of operation Ft is updated and increased by a step of C4 (default value C4=0.5 khz) If the value of Vpc_meas/Vs>C5 (default value C3=0.225). The updates to the frequency are performed as long as the ratio is below C5. If either of these processes causes the Ft to be shifted by more than C6 from last calibrated Ft, than re-calibration procedure is applied (default C6=2.5 khz) The sampling period for this test is C7 (default C5=200 usec) and it should be initiated after the above fast adoption was completed and not while it's operating. The algorithm may also be performed by tracking Ipc (i.e. the current flowing through Tx main coil or capacitor). The above implementation was provided as an example, but it should be clear that any number of modifications to the above algorithm are possible.

In some exemplary embodiments, the operational voltage Vs may be sharply reduced (beyond the above described compensation factor), if a sudden increase in the tracked voltage/current is sensed, and previously known stable operation point was for a high load (as indicated by power reports from receiver or measured in Tx). This will indicate a load switch from high mode to low mode, and may cause dangerous increase in receiver voltage. The above mechanism is used to quickly stop this voltage/current increase before it can cause any damage.

In some exemplary embodiments, the operational voltage Vs may be increased beyond the above described compensation factor by a 'boost' factor, if a sudden decrease in the tracked voltage/current is sensed, and previously known stable operation point was for a low load (as indicated by power reports from receiver or measured in Tx). This will indicate a load switch from low load to high load, and may cause dramatic decrease in receiver voltage to a point of shut down. The above mechanism is used to quickly stop this voltage/current decrease before it can cause a receiver to shut down.

In some exemplary embodiments, controller 151 may be configured to automatically switch driver 152 from half-bridge mode, providing up to 5 watts, to full-bridge mode, providing up to 15 watts. One of the criteria for switching between modes (half, full) may be device 20 dependent, which may be indicated over the standard communication protocol. It shall be noted that typical device 20 may also switch between modes (low, high) to adjust for their higher power needs and vice versa. To satisfy higher power requirements needs of the device 20, the Tx 100 may operate at OPF range closer to the MRF, switch to full mode, any combination thereof, or the like. Each of which are means for providing, by the Tx 100, higher operational energy levels that may exceed the standard of 5 W transmitters. In some exemplary embodiments, higher energy level may be provided to make up for loads at different misalignments position with respect to the relay. In contrast, less energetic level provided to similar loads (i.e. having the same power needs) that are well aligned with respect to the relay.

It shall be noted that the voltage induced on the rectifying stage of a device 20 depends on the magnitude of the induced magnetic field, and the device 20 output load. For device 20 in low mode, the induced voltage is higher compared to device 20 in high mode. When a device 20 operating at high mode switches its load off or turns it to low mode, a surge of voltage occurs. Typically, commercially available device 20 is designed to accommodate this switching effect without being damaged.

It shall also be noted that standard specification of WPC calls for periodic power control messages (i.e. standard communication protocol) every 0.25 second in order to accommodate for sporadic loss of communication with the transmitter. The WPC specification defines that a transmitter should cease power delivery if the transmitter doesn't replay within 2 seconds.

One technical problems dealt with by the present disclosure relates to instances that occur when device 20, having active high-power load, is placed at considerable misalignment that may cause the Tx 100 to operate at extremely energetic level in order to make up for required power. A sudden move of the device 20 to proper alignment shall instantaneously drop the load, while the unaware Tx 100 may sustain its extremely energetic level, consequently driving the device 20 rectified voltages extremely high and may damage the device 20 circuitry. Likewise, sudden remove and replace of device 20 on the transmitter may lead to similar consequences.

Another technical problem dealt with by the present disclosure relates to instances that occur when a device 20, in high power mode, is quickly replaced by device 20 that doesn't support high power mode.

Yet another technical problem dealt with by the present disclosure relates to sporadic loss of communication between the Tx 100 and device 20. Additionally, a charging pad or the relay of the present disclosure may be exposed to excessive energetic magnetic field for as long as 2 seconds which may damage objects placed in the vicinity of the magnetic field.

One technical solution is based on fixed limitation by Tx 100. In some exemplary embodiments, fixed limitation may be performed by setting a minimal OPF range, maximal duty cycle or amplitude that the Tx 100 can use as to control the maximal power operation point. The maximal power point, for commercially available device 20, may be selected such that highest inductance and coupling affecting the rectified voltage created on device 20, when properly aligned, may be below the typical damage voltage (15-20V) for device 20.

Another technical solution can be based on detecting changes to the reflected impedance. In some exemplary embodiments, controller 151 detects changes in the real part of the reflected impedance of a receiver in real time. The reflected impedance may be determined by calculations based current, voltage amplitude and phase measurements, conducted by controller 151, as previously depicted. Controller 151 may then calculate the overall circuit impedance and remove its own components contribution, to derive the reflected impedance value. It shall be noted that the reflected impedance of the device 20 also depends on the parameters of the device 20 circuit, i.e. inductance, its alignment with the relay, reflected in coupling factor k, and its load, i.e. battery.

In some exemplary embodiments, any one the problems listed above may be reflected in impedance change. For example, if device 20 operates at high power mode and the impedance is relatively high, the device 20 is removed and a sudden drop of the impedance may be detected. Yet another example: if device 20 that is not well aligned and then moved in to better alignment would on the other hand show a sudden increase in the reflected impedance, low to high mode switching would also yield increase in impedance.

Yet another example: if device 20 is substantially not aligned and operating at low mode, it may reach these energetic carrier settings. Mode switching in this case may create similar effect to re-alignment. Yet another example: a sudden decrease in the reflected impedance when Tx 100 is driving high power may indicate either a power mode switch in the device 20, i.e. high to low mode, or complete removal. Yet another example: a sudden increase in the reflected impedance when Tx 100 provide high power while operating in energetic OPF may indicate re-alignment, low to high mode switch for improperly aligned device 20.

Following these impedance indications, the controller 151 may implement a power shutdown, limit the power based on the measurement of the reflected impedance, shift the OPF to less energetic, any combination thereof, or the like. These procedures may be used to protect the device 20 from all of the above listed problem scenarios and minimize the exposure of device 20 to excessive voltage levels.

Yet another technical solution can be based on consumed power of the Tx 100. In some exemplary embodiments, upon removal of the device 20 from the relay pad, the consumed power may significantly drop. Similar effect may be observed if the device 20 switches from high to low mode or no load. The consumed driving power may determine by tracking the current, OPF, duty cycle, amplitude and overall power consumption.

In exemplary embodiments where the OPF is highly energetic, i.e. potential to damage device 20 in full alignment, and power consumption is above a specific threshold. The controller 151 shall monitor the consumed power in search of significant power drops on a short time period and wait for additional period of time (Twait) while monitoring messages. If no power control messages were received within the defined time period, the controller 151 shall either shutdown the power or significantly reduces its energy by increasing frequency or lowering duty cycle or amplitude. In some exemplary embodiments, this procedure allows differentiating between a controlled device 20 switch and unwanted sudden removal. In the case of device 20 switches, the device 20 is expected to send, rather rapidly, a power control message to indicate request for lowering of delivered power. In case of unwanted sudden removal, such message will not be sent.

In another exemplary embodiment on detection of sudden power drop above a certain threshold, the controller 151 shall immediately and significantly reduce the power carrier energy, by increasing frequency or lowering duty cycle or amplitude.

As an example, a Tx 100 configure to operate at OPF range of 110-200 khz at full bridge mode and the OPF is below 145 khz, the controller 151 tracks the power consumption. If power consumed is greater than 5 W and drops during a period of 1 msec below 1 W, the controller 151 waits for Twait=100 msec to receive power control message from device 20. If no message is received during this time period, the controller 151 shall switch off the power and return to standby. Additionally, or alternatively, Tx 100 may respond to the above changes by reducing the OPF, duty cycle or amplitude or increase of frequency immediately, and then completely shutting down if no power control message is received within a predefined time interval.

In some exemplary embodiments of the present disclosure, the above depicted solutions and procedures of fixed limitation: reflected impedance and consumed power may be combined to provide yet other alternative solutions. For example, detection of removal can be based on the consumed power, and detection of re-alignment could be based on a change of reflected impedance.

Yet another technical solution may be based on enhancing the available signaling specification of WPC standard. In some exemplary embodiments, the periodic power control messages may be reduced from 0.25 second to a range of 2-10 milliseconds, using load modulation of the device 20 communication circuits, e.g. toggling connection of ancillary load. Additionally, or alternatively, signaling specification of WPC standard may be supplemented with beacon signal, continuously transmitted in absence of standard WPC communication. It shall be the Tx 100 responsibility to monitor the beacon and WPC massage reception. Lack of either one of them for a pre-defined period, e.g. 10-80 milliseconds, shall cease power transfer.

In some exemplary embodiments, measurement windows for consumed power provided by the device 20 and executed by the Tx 100 may be synchronized to the beckon signal.

One technical effect of utilizing the standard enhancements of disclosed subject matter is reducing the risk of damaging the device 20 due to removal and or replacement, as well as limiting the duration that device 20 may be exposed to higher power levels for which it is not designed.

The components detailed above may be implemented as one or more sets of interrelated computer instructions, executed for example by controller 151 or by another processor. The components may be arranged as one or more executable files, dynamic libraries, static libraries, methods, functions, services, or the like, programmed in any programming language and under any computing environment.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A transmitter configured to inductively transfer power to a device, the transmitter comprising:

circuitry configured to measure a current or voltage and reconfigure the transmitter with an operating frequency or duty cycle in accordance with the measured current or measured voltage;

wherein the power is inductively transferred to the device via a relay, wherein the transmitter and the relay are separated by a medium with no galvanic connection; and circuitry configured to cease power transfer based on a measured current drop and a power correction message not being received from the device for a period.

2. The transmitter of claim 1, wherein the transmitter is reconfigured with an increased power, reduced power or cease of power.

3. The transmitter of claim 1, wherein the transmitter is configured to utilize the measured current or voltage to determine a change in a joint resonance frequency of the transmitter and the relay with respect to a predetermined range.

4. The transmitter of claim 3, wherein the transmitter is configured to cease power transfer upon a change of the joint resonance frequency.

5. The transmitter of claim 4, wherein the transmitter is configured to perform a recalibration followed by a resumption of power transfer.

6. The transmitter of claim 1, wherein the transmitter is configured to calculate a change in a reflected impedance, based on the measured current or voltage, wherein the transmitter is configured to perform a reconfiguration in response to the calculation of the change.

7. The transmitter of claim 1, wherein the transmitter is configured to cease power transfer based on a measurement indicating a current drop and no power correction message being received from the device for a predefined time period.

8. The transmitter of claim 1, wherein the transmitter utilizes the measured current or voltage to determine a change in a joint resonance frequency with respect to an allowed predetermined range.

9. The transmitter of claim 8, wherein the transmitter ceases to transfer power upon the change in joint resonance frequency; wherein the transmitter is configured to perform a recalibration followed by a resumption of a transfer of power.

10. The transmitter of claim 1, further comprising:
circuitry configured to reconfigure the transmitter upon a measured increase in the current or voltage within a time period.

11. The transmitter of claim 10, wherein the transmitter is reconfigured to decrease power based on the measured increase in the current or voltage.

12. A method for inductively transferring power from a transmitter to a device, the method comprising:
measuring, by the transmitter, a current or voltage and reconfiguring the transmitter with an operating frequency or duty cycle in accordance with the measured current or measured voltage;

wherein the power is inductively transferred to the device via a relay, wherein the transmitter and the relay are separated by a medium with no galvanic connection; and ceasing power transfer based on a measured current drop and a power correction message not being received from the device for a period.

13. The method of claim 12, further comprising:
reconfiguring the transmitter with an increased power, reduced power or cease of power.

14. The method of claim 12, further comprising:
utilizing the measured current or voltage to determine a change in a joint resonance frequency of the transmitter and the relay with respect to a predetermined range.

15. The method of claim 14, further comprising:
ceasing power transfer upon a change of the joint resonance frequency.

16. The method of claim 15, further comprising:
performing a recalibration followed by a resumption of power transfer.

17. The method of claim 12, further comprising:
calculating a change in a reflected impedance, based on the measured current or voltage; and
performing a reconfiguration in response to the calculation of the change.

18. The method of claim 12, further comprising:
ceasing power transfer based on a measurement indicating a current drop and no power correction message being received from the device for a predefined time period.

19. The method of claim 12, further comprising:
utilizing the measured current or voltage for determining a change in a joint resonance frequency with respect to an allowed predetermined range.

20. The method of claim 19, further comprising:
ceasing to transfer power upon the change in joint resonance frequency; and
performing a recalibration followed by a resumption of a transfer of power.

21. The method of claim 12, further comprising:
reconfiguring the transmitter upon a measured increase in the current or voltage within a time period.

22. The method of claim 21, further comprising:
reconfiguring the transmitter to decrease power based on the measured increase in the current or voltage.

* * * * *